US010193320B1

(12) United States Patent
Milligan et al.

(10) Patent No.: US 10,193,320 B1
(45) Date of Patent: Jan. 29, 2019

(54) INTEGRAL TERMINAL COMPARTMENT WITH DEPLOYABLE TERMINAL BLOCK

(71) Applicant: Pelco Products, Inc., Edmond, OK (US)

(72) Inventors: David R. Milligan, Oklahoma City, OK (US); Kenneth E. George, Edmond, OK (US)

(73) Assignee: Pelco Products, Inc., Edmond, OK (US)

( * ) Notice: Subject to any disclaimer, the term of this patent is extended or adjusted under 35 U.S.C. 154(b) by 0 days.

(21) Appl. No.: 15/728,654

(22) Filed: Oct. 10, 2017

Related U.S. Application Data

(60) Provisional application No. 62/406,067, filed on Oct. 10, 2016.

(51) Int. Cl.
| | | |
|---|---|---|
| H01R 9/00 | (2006.01) | |
| H02G 7/20 | (2006.01) | |
| G08G 1/095 | (2006.01) | |
| E04H 12/22 | (2006.01) | |

(52) U.S. Cl.
CPC ............ *H02G 7/20* (2013.01); *E04H 12/22* (2013.01); *G08G 1/095* (2013.01)

(58) Field of Classification Search
CPC .......... G08G 1/095; E04H 12/22; H02G 7/20
USPC ...................................................... 361/823
See application file for complete search history.

(56) References Cited

U.S. PATENT DOCUMENTS

| | | | |
|---|---|---|---|
| 3,586,280 A | 6/1971 | Parduhn | |
| 3,624,269 A * | 11/1971 | Latta | E04H 12/003 174/45 R |
| 3,764,099 A | 10/1973 | Parduhn | |
| 3,808,504 A | 4/1974 | Rabie | |
| 3,854,685 A | 12/1974 | Parduhn | |
| 4,032,248 A | 6/1977 | Parduhn et al. | |
| D276,213 S | 11/1984 | Parduhn | |

(Continued)

OTHER PUBLICATIONS

West Coast Engineering Group Ltd., "The Bulldog" promotional flier from West Coast Engineering Group Ltd., Delta, BC V4G 1E3 Canada. The first publication date of this reference is unknown. This document was published prior to the effective filed of the instant application, namely, Oct. 10, 2017, and prior to any foreign priority date of the present application.

(Continued)

*Primary Examiner* — Hung S Bui

(74) *Attorney, Agent, or Firm* — Mary M. Lee

(57) ABSTRACT

A terminal compartment for installation in the hand hole of a utility pole. The compartment comprises a frame, such as an oval weldment ring with a cover. A terminal block support is movably mounted in the compartment for movement between an operating position and a deployed position. In the operating position, a terminal block fixed to the terminal block support is contained entirely inside the internal space of the utility pole. In the deployed position, the terminal block extends through the access opening at least partially outside the pole. The terminal block support may be an elongate rigid strip mounted vertically inside the compartment with a bottom end hingedly attached to the frame. In this way, once the cover is removed, the terminal block can be folded down to a horizontal position extending out through the access opening and affording easy access for repair and maintenance.

10 Claims, 10 Drawing Sheets

(56) References Cited

U.S. PATENT DOCUMENTS

| | | | |
|---|---|---|---|
| 4,595,255 A * | 6/1986 | Bhatt | G02B 6/4452 |
| | | | 385/135 |
| 4,659,046 A | 4/1987 | Parduhn | |
| 4,914,258 A | 4/1990 | Jackson | |
| D328,243 S | 7/1992 | Parduhn | |
| D329,589 S | 9/1992 | Parduhn | |
| D335,279 S | 5/1993 | Parduhn | |
| 5,299,111 A | 3/1994 | Parduhn et al. | |
| 5,524,411 A | 6/1996 | Crossman | |
| D373,947 S | 9/1996 | Parduhn | |
| D379,756 S | 6/1997 | Parduhn | |
| 5,645,255 A | 7/1997 | Parduhn | |
| 6,204,446 B1 * | 3/2001 | Parduhn | E04H 12/003 |
| | | | 174/45 R |
| 6,357,709 B1 | 3/2002 | Parduhn | |
| 6,683,247 B1 | 1/2004 | McTavish et al. | |
| 6,833,505 B1 | 12/2004 | Macchietto | |
| 7,157,642 B2 | 1/2007 | Bowman et al. | |
| 7,258,314 B1 | 8/2007 | Parduhn et al. | |
| 7,420,815 B2 * | 9/2008 | Love | G06F 1/181 |
| | | | 29/830 |
| 7,523,912 B1 | 4/2009 | Woods | |
| 7,601,928 B1 | 10/2009 | Magness et al. | |
| 7,997,546 B1 | 8/2011 | Anderson et al. | |
| 8,173,904 B1 | 5/2012 | Parduhn et al. | |
| 8,446,715 B2 * | 5/2013 | Su | G06F 1/1667 |
| | | | 174/138 E |
| 8,474,780 B2 | 7/2013 | Parduhn et al. | |
| 8,875,451 B1 | 11/2014 | Parduhn et al. | |
| 9,200,654 B1 | 12/2015 | Parduhn | |
| 9,316,349 B1 | 4/2016 | Parduhn et al. | |
| 9,322,536 B1 | 4/2016 | Parduhn et al. | |
| 9,559,275 B2 | 3/2017 | Parduhn et al. | |
| 9,599,275 B1 | 3/2017 | Parduhn et al. | |
| 9,933,037 B1 | 4/2018 | George et al. | |
| 10,024,492 B1 | 7/2018 | George et al. | |
| 10,026,312 B1 | 7/2018 | George et al. | |
| 2011/0095162 A1 | 4/2011 | Parduhn et al. | |
| 2016/0210849 A1 | 7/2016 | Stussi et al. | |

OTHER PUBLICATIONS

Angel-Guard Products, Inc., "U-Cover Universal Hand Hole Cover," promotional flier from Angel-Guard Products, Inc., Worcester, MA 01603 The first publication date of this reference is unknown. This document was published prior to the effective filing date of the instant application, namely, Oct. 10, 2017, and prior to any foreign priority date of the present application.

* cited by examiner

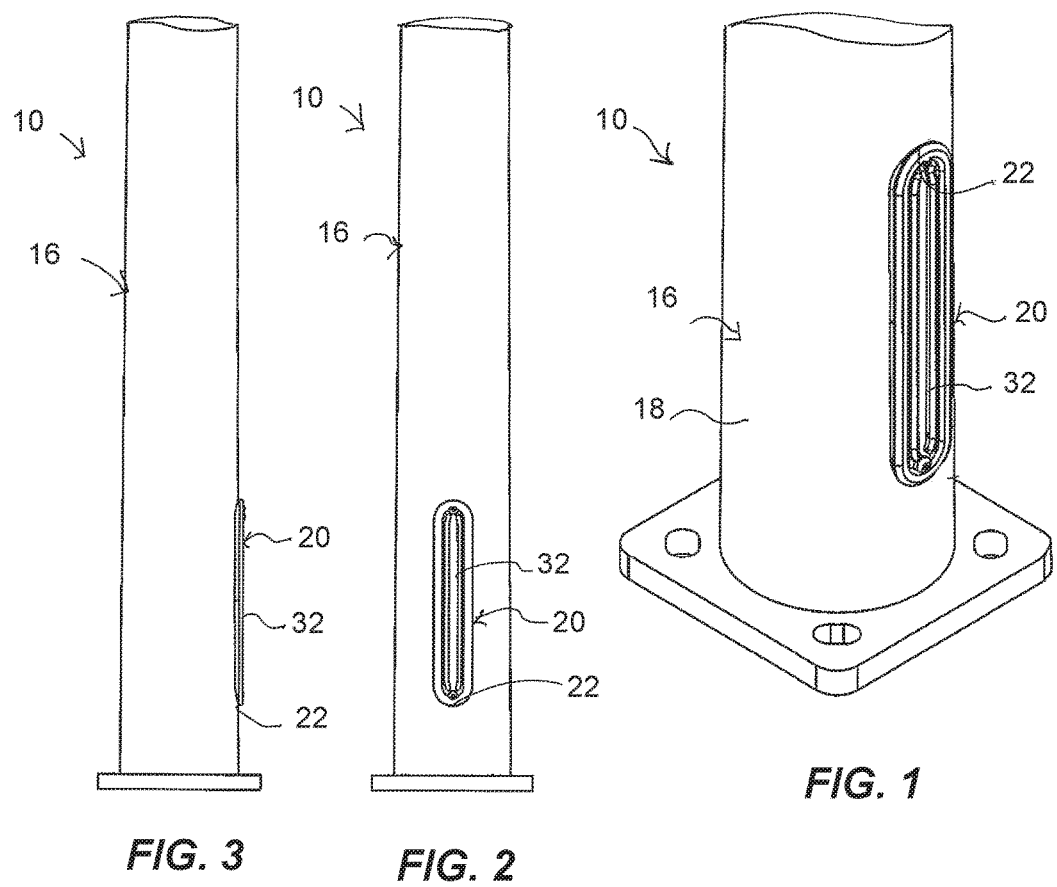

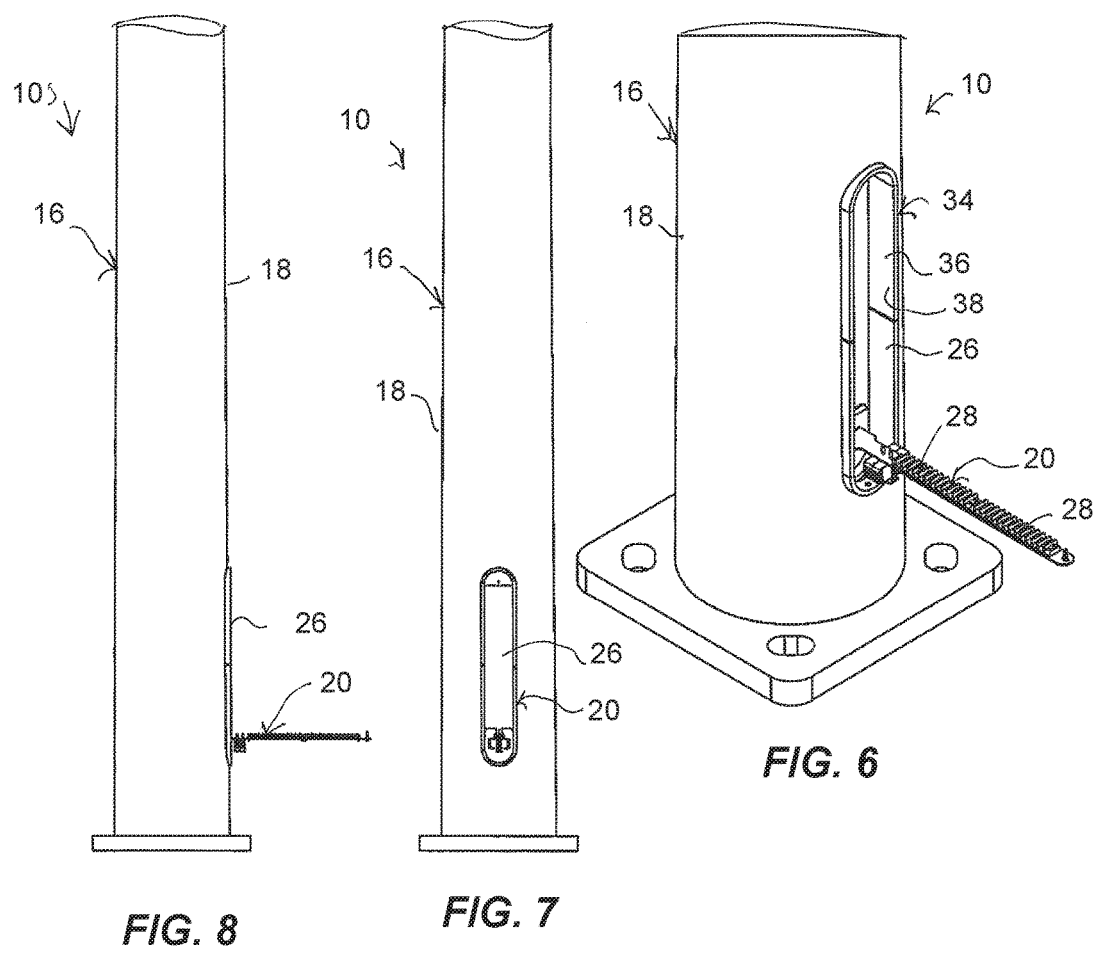

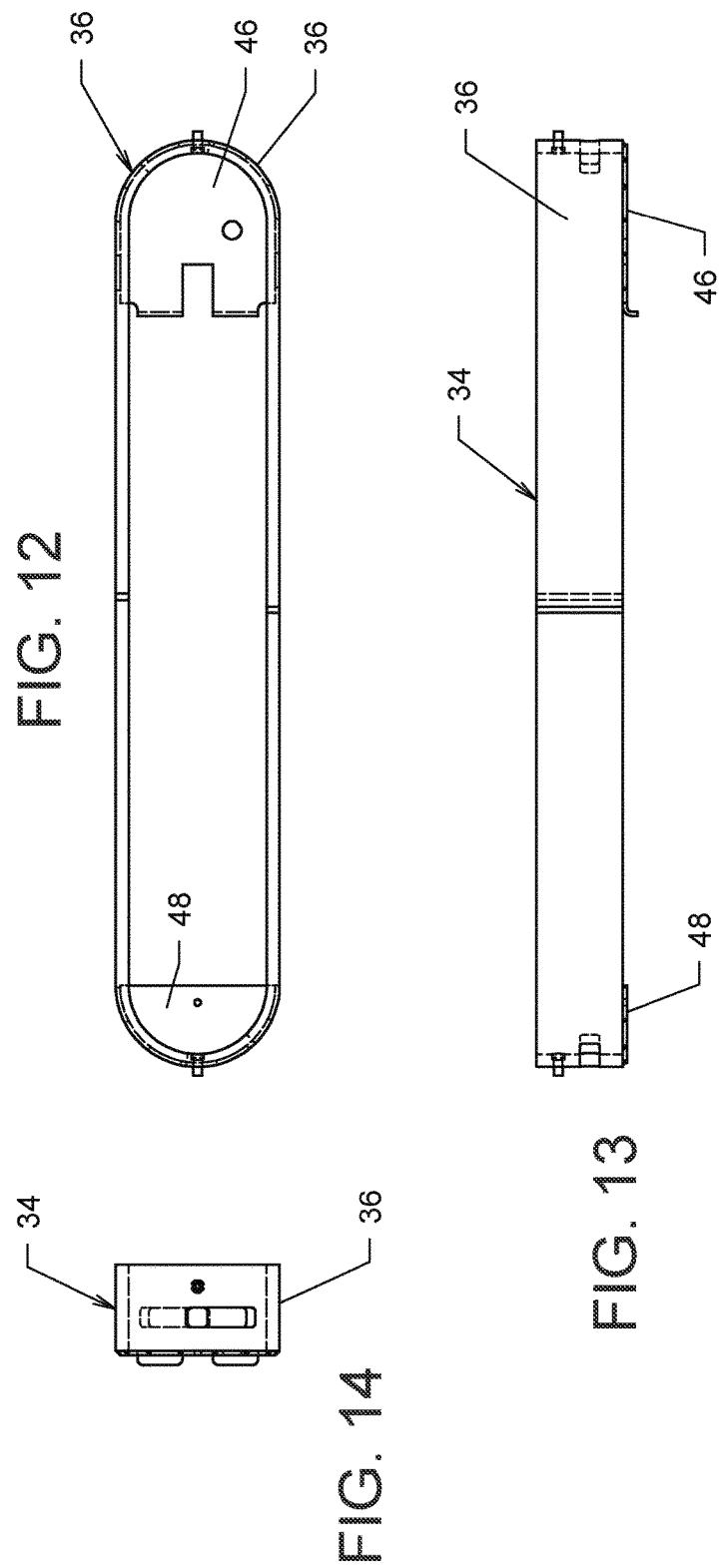

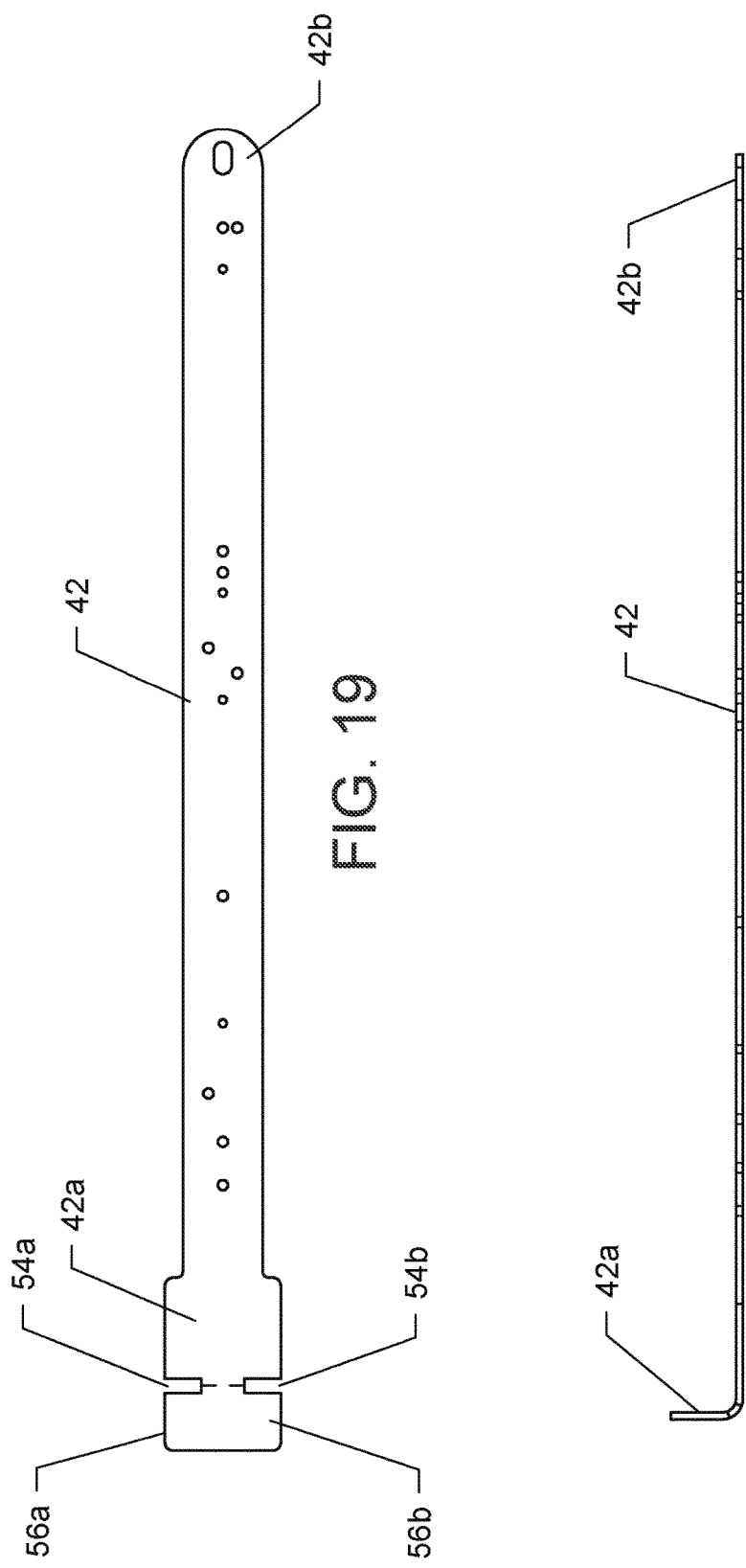

INTEGRAL TERMINAL COMPARTMENT WITH DEPLOYABLE TERMINAL BLOCK

FIELD OF THE INVENTION

The present invention relates generally to traffic control devices and more particularly, but without limitation, to hand hole compartments for utility poles.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate a preferred embodiment of the invention and are not to be construed as limiting the scope of the invention.

FIG. 1 is a frontal perspective view of the base of a utility pole showing the hand hole with a cover.

FIG. 2 is a frontal elevational view of the pole base shown in FIG. 1.

FIG. 3 is a side elevational view of the pole base shown in FIG. 1.

FIG. 6 is a frontal perspective view of the base of a utility pole with the hand hole cover removed and illustrating the fold-out terminal block.

FIG. 7 is a frontal elevational view of the pole base shown in FIG. 6.

FIG. 8 is a side elevational view of the pole base shown in FIG. 6.

FIG. 12 is a front elevational view of the weldment.

FIG. 13 is an elevational view of the upper end of the weldment shown in FIG. 12.

FIG. 14 is a side elevational view of the weldment shown in FIG. 12.

FIG. 19 is a front elevational view of the strip plate.

FIG. 20 is a side elevational view of the strip plate shown in FIG. 19.

DETAILED DESCRIPTION OF THE PREFERRED EMBODIMENT(S)

Figures 4, 5:
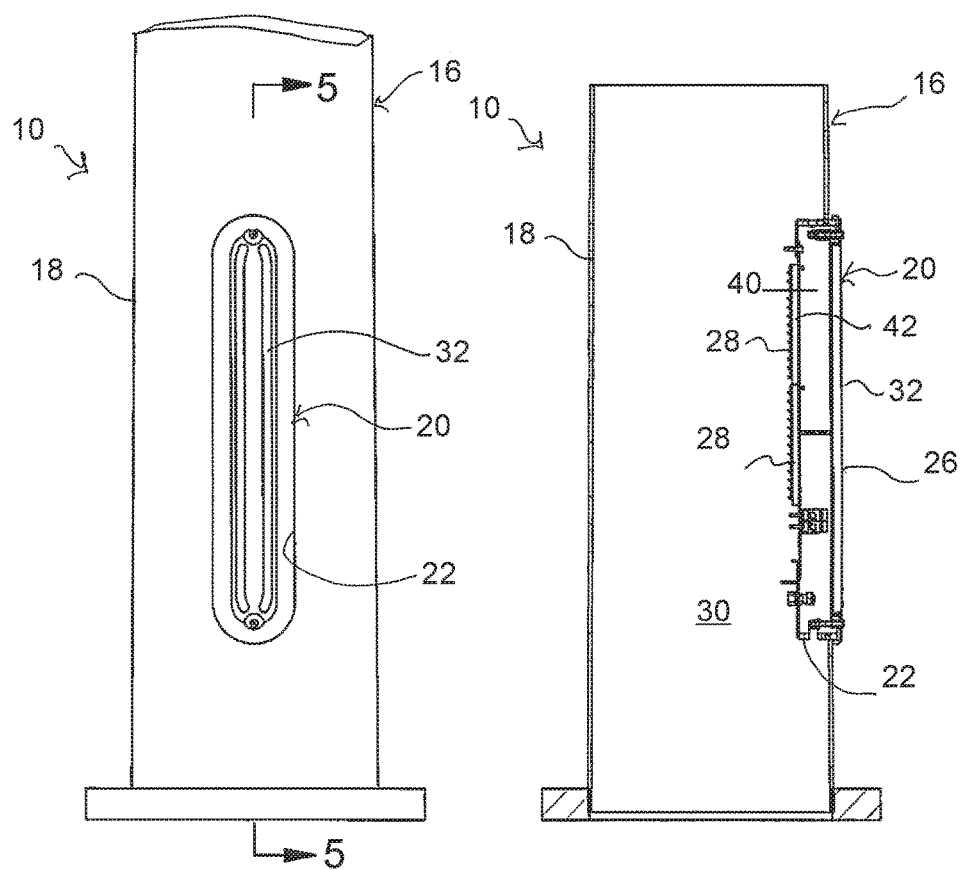
FIG. 4 is an enlarged front elevational view of the pole base shown in FIG. 1.
FIG. 5 is a longitudinal sectional view taken along line 5-5 of FIG. 4.

Traffic control devices, street lights and other equipment supported on utility poles are supplied by wiring contained inside the pole. An access opening or "hand hole" is provided in the side of the pole, usually about knee height, for accessing the wiring. Electrical connections, such as terminal blocks and fuse disconnects, are supported inside the pole base in a hand hole compartment or terminal compartment. An example of a terminal compartment that includes the weldment that fits in the hand hole, a terminal block support, and a cover, comprise an integrated terminal compartment or ITC. One such ITC is shown and described in U.S. Pat. No. 6,204,446, issued Mar. 20, 2001, entitled "Handhole Compartment," and the contents of this patent are incorporated herein by reference.

Access to the terminal block is required occasionally for maintenance and repair. Because of the small confined space available inside the base of the pole, manipulating the wires and connecting and disconnecting them from the terminal block is difficult. The present invention provides faster and more convenient access to the terminal block. These and other features and advantages of the present invention will become apparent from the following description with reference to the accompanying drawings.

Turning now to the drawings in general and to FIGS. 1-10 in particular, there is shown therein a traffic control assembly designated generally by the reference number 10. The traffic control assembly 10 comprises a traffic control device (not shown) supported on a utility pole assembly 16. The pole assembly 16 includes a pole 18 with a terminal block assembly 20 installed in the hand hole 22. As used herein, "traffic control device" denotes any device useful in monitoring, illuminating, directing, informing, or controlling pedestrian or vehicular traffic on roadways, parking lots, walkways, and the like, and includes without limitation traffic signals, cameras, antennas, sensors, monitors, signs, junction boxes, wireless devices, microwave transmission devices, lights, horns and other warning devices, and counting devices. As used herein, "utility pole" means any tubular structure forming all or part of a support for a traffic control device.

Figures 9, 10:
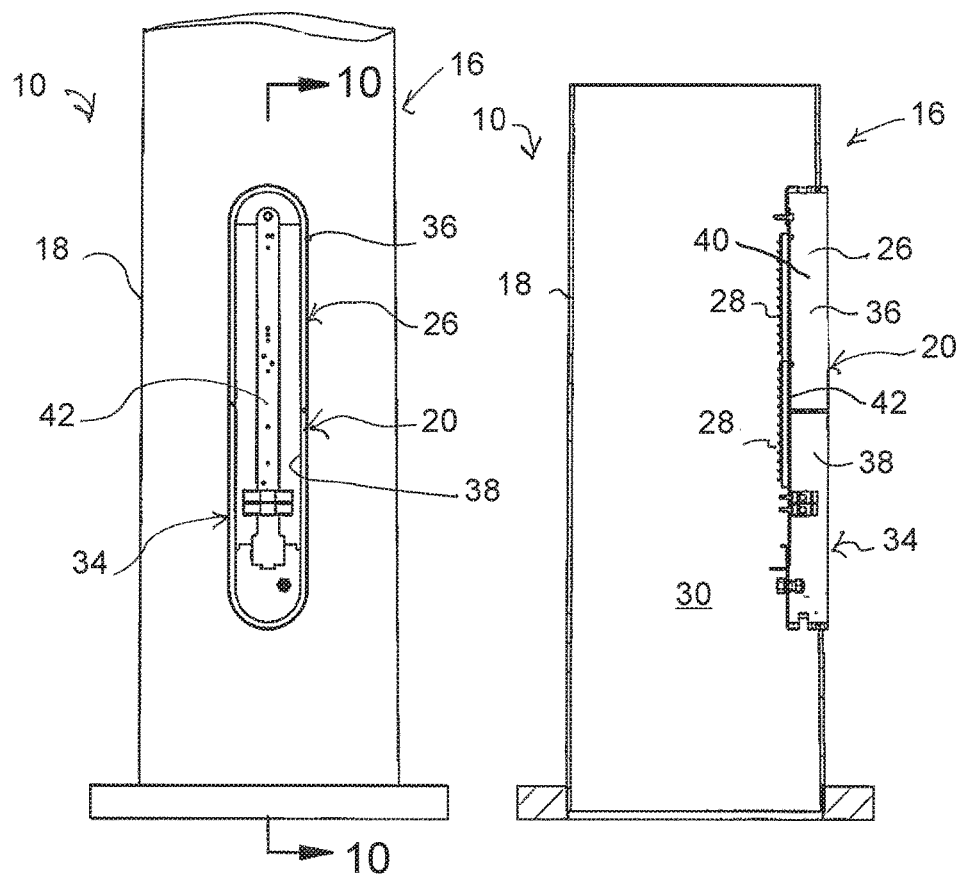
FIG. 9 is an enlarged front elevational view of the pole base shown in FIG. 6.
FIG. 10 is a longitudinal sectional view taken along line 10-10 of FIG. 9.

As best shown in FIGS. 5, 6, and 10, the terminal block assembly 20 comprises a terminal compartment 26 that houses one or more terminal blocks 28 inside the internal space 30 (FIGS. 5&10) of the pole 18. The phrase "terminal block" means any kind of connector that allows multiple circuits to be disconnected at a single location. The terminal compartment 26, described more fully below, includes a removable cover 32.

As best shown in FIGS. 6-10, which the terminal compartment 26 comprises a frame 34 that may include an oval sidewall 36 that fits inside the hand hole 22 and defines an access opening 38 and an enclosure 40 that houses the terminal blocks 28. A terminal block support 42 is movably mounted in the enclosure 40 for movement between an operating position, shown in FIGS. 5 and 10, and a deployed position, seen in FIG. 6. In the operating position, the terminal blocks 28 are contained entirely inside the internal space 30 of the utility pole 18. In the deployed position, the terminal blocks 28 extend through the access opening 38 at least partially outside the pole 18.

Figure 11:
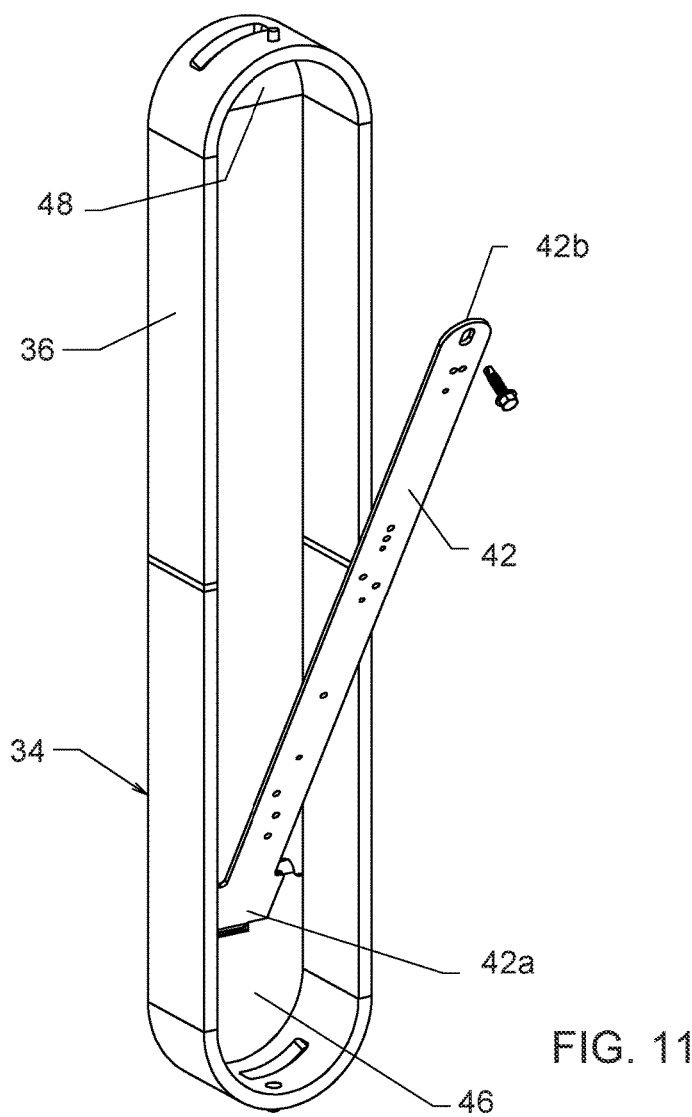
FIG. 11 is a frontal perspective of a terminal block assembly made in accordance with a preferred embodiment of the present invention. The terminal block is omitted to simplify the illustration.

FIG. 11 illustrates the terminal compartment 26 without the cover 32. In this preferred embodiment, the terminal block support 42 takes the form of an elongate rigid strip with a first end 42a and a second end 42b. Movement between the deployed position and the operating position in this embodiment is accomplished by pivotally attaching the first end 42a of the strip 42 to the frame. More specifically, the rigid strip pivots about an axis that is normal to the longitudinal axis of the utility pole 18. In this way, in the deployed position, the rigid strip 42 is vertically positioned (FIGS. 5&10) with the second end 42b of the rigid strip above the first end 42a, and in the deployed position the second end of the rigid strip is outside the access opening, as seen in FIG. 6.

Figure 15:
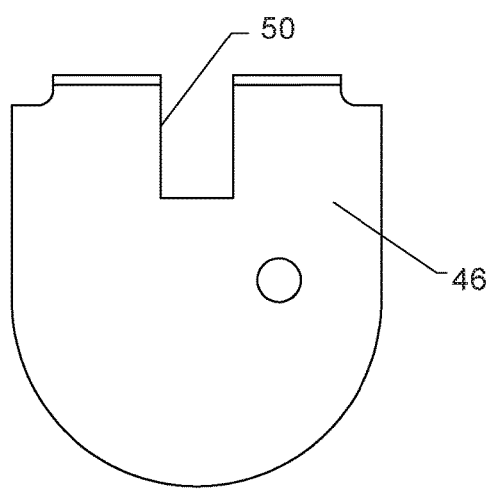
FIG. 15 is a front elevational view of the back plate.
Figure 16:
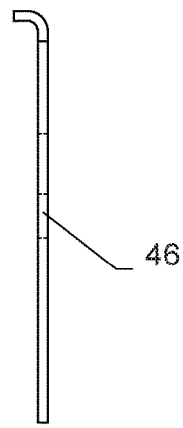
FIG. 16 is a side elevational view of the back plate shown in FIG. 15.
Figure 17:
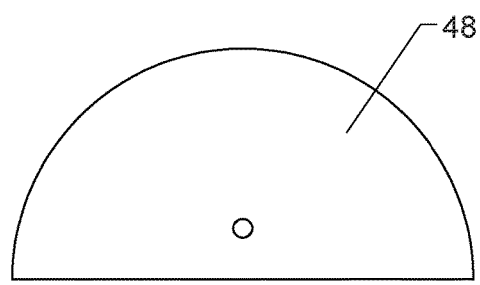
FIG. 17 is a front elevational view of the endplate.
Figure 18:
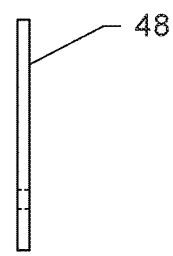
FIG. 18 is a side elevational view of the end plate shown in FIG. 17.

FIGS. 12-14 show preferred structure and dimensions for the weldment that forms the sidewall 36 of the frame 34. The frame 34 may also include a back plate 46 and an end plate 48. As shown in FIGS. 15 and 16, the back plate 46 is planar member configured to fit in or on the back of the bottom end of the sidewall 36. A vertical notch 50 receives the first end 42a of the strip 42 to form a hinge. The end plate 48 is also planar and configured to fit in or on the back of the upper end of the sidewall 36.

FIGS. 19 and 20 show preferred structure and dimensions for the rigid strip 42. FIG. 19 shows the strip flat after being formed but prior to being bent, as shown in FIG. 20. The first end 42a has side notches 54a and 54b that form ears 56a and 56b. The side view of FIG. 20 shows the first end 42a of the strip 42 bent into a right angle. In the right angle position, side notches 54a and 54b engage with the notch 50 in the back plate 46, to form a hinge. When the strip 42 is upright, the end 42a extends into the internal space 30 of the pole 18. When the strip 42 is folded down to the deployed position, the ears 56a and 56b abut the back surface of the backplate 46 forming a stop to maintain the strip 42 in a horizontal position.

Figure 21:
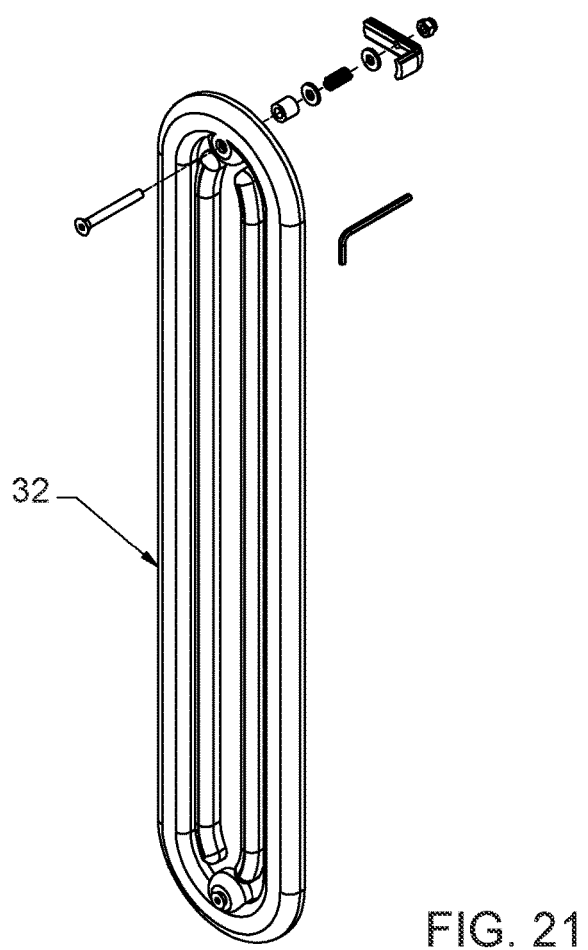
FIG. 21 is an exploded perspective view of a cover assembly.

FIG. 21 shows a preferred structure for the removable cover 32.

The embodiments shown and described above are exemplary. Many details are often found in the art and, therefore, many such details are neither shown nor described herein. It is not claimed that all of the details, parts, elements, or steps described and shown herein are newly invented. Changes may be made in the details, especially in matters of shape, size, and arrangement of the parts, within the principles of the inventions to the full extent indicated by the broad meaning of the terms in the attached claims. The description and drawings of the specific embodiments herein do not point out what an infringement of this patent would be, but rather provide non-limiting examples of how to use and make the invention. Likewise, the abstract is neither intended to define the invention, which is measured by the claims, nor is it intended to be limiting as to the scope of the invention in any way. The limits of the invention and the bounds of the patent protection are measured by and defined in the following claims.

What is claimed is:

1. A terminal compartment for supporting a terminal block inside an internal space of a utility pole, the utility pole having a hand hole for accessing the internal space, the compartment comprising:
   a frame mountable in the hand hole of the utility pole and defining an access opening and an enclosure; and
   a terminal block support movably mounted in the enclosure of the frame for movement between an operating position and a deployed position, wherein in the operating position a terminal block fixed to the terminal block support is contained entirely inside the internal space of the utility pole, and wherein in the deployed position a terminal block fixed to the terminal block support will extend through the access opening at least partially outside the pole.

2. The terminal compartment of claim 1 wherein the frame comprises an oval sidewall.

3. The terminal compartment of claim 1 further comprising a removable cover sized to cover the access opening.

4. The terminal compartment of claim 1 wherein the terminal block support comprises an elongate rigid strip.

5. The terminal compartment of claim 4 wherein the rigid strip has a first end and a second end, wherein the first end is pivotally attached to the frame.

6. The terminal compartment of claim 5 wherein the rigid strip pivots about an axis that is normal to the longitudinal axis of the utility pole.

7. The terminal compartment of claim 6 wherein in the deployed position the rigid strip is vertically positioned with the first end of the rigid strip below the second end and so that in the deployed position the second end of the rigid strip is outside the access opening.

8. A terminal block assembly comprising the terminal compartment of claim 1 and a terminal block secured to the terminal block support.

9. A utility pole assembly comprising a utility pole and a terminal block assembly as defined in claim 8 installed in the hand hole.

10. A traffic control assembly comprising the utility pole assembly of claim 9 and traffic control device mounted on the utility pole.

* * * * *

UNITED STATES PATENT AND TRADEMARK OFFICE
CERTIFICATE OF CORRECTION

PATENT NO. : 10,193,320 B1
APPLICATION NO. : 15/728654
DATED : January 29, 2019
INVENTOR(S) : David R. Milligan and Kennith E. George Page 1 of 1

It is certified that error appears in the above-identified patent and that said Letters Patent is hereby corrected as shown below:

On the Title Page
Column 2, Other Publications, Line 4: replace "filed" with --filing date--.
Page 2, Column 2, References Cited: delete "9,559,275 B2 3/2017 Parduhn et al.".

In the Specification
Column 2, Line 40: replace "5&10" with --5 & 10--.
Column 2, Line 67: replace "5&10" with --5 & 10--.

Signed and Sealed this
Ninth Day of April, 2019

Andrei Iancu
*Director of the United States Patent and Trademark Office*